United States Patent
Hada et al.

(10) Patent No.: US 10,620,021 B2
(45) Date of Patent: Apr. 14, 2020

(54) ELECTRONIC DEVICE HAVING SUBSTRATE MOUNTING SONIC WAVE OUTPUT ELEMENT THAT OUTPUTS AND RECEIVES SONIC WAVE, PEDESTAL TO WHICH THE SUBSTRATE IS ATTACHED MADE OF A NONCONDUCTIVE MATERIAL, FRAME TO WHICH THE PEDESTAL IS ATTACHED MADE OF A CONDUCTIVE MATERIAL, AND CONDUCTIVE TAPE OR CONDUCTIVE LEAF SPRING WHICH CONTACTS SUBSTRATE AND FRAME

(71) Applicant: CANON KABUSHIKI KAISHA, Tokyo (JP)

(72) Inventors: Manabu Hada, Kawasaki (JP); Michio Fukushima, Yokohama (JP); Junnosuke Yokoyama, Toride (JP); Yusuke Horishita, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 15/652,091

(22) Filed: Jul. 17, 2017

(65) Prior Publication Data

US 2018/0032022 A1 Feb. 1, 2018

(30) Foreign Application Priority Data

Jul. 29, 2016 (JP) ................. 2016-149190

(51) Int. Cl.
*G01D 11/30* (2006.01)
*G03G 15/00* (2006.01)
(Continued)

(52) U.S. Cl.
CPC .............. *G01D 11/30* (2013.01); *G01S 15/04* (2013.01); *G03G 15/5004* (2013.01);
(Continued)

(58) Field of Classification Search
CPC .............. G03G 15/50; G03G 15/5004; G03G 15/5091; G03G 15/80; G03G 21/1619; G03G 21/1642; G03G 21/1647; G03G 2215/019; G03G 2221/1651; G03G 2221/1678; G01S 7/52096; G01S 15/02;
(Continued)

(56) References Cited

U.S. PATENT DOCUMENTS 2,827,978 A * 3/1958 Henry .................. G01N 29/032
73/646
2002/0156373 A1* 10/2002 Wakabayashi ........ B06B 1/0622
600/437
(Continued)

FOREIGN PATENT DOCUMENTS

JP 2015-195548 A 11/2015

*Primary Examiner* — Benjamin R Schmitt
(74) *Attorney, Agent, or Firm* — Canon U.S.A., Inc. I.P. Division (57) ABSTRACT

A human presence sensor unit in which an ultrasonic wave sensor is mounted is fixed to a frame sheet metal of an image forming apparatus with a pedestal interposed therebetween. The pedestal is made of a synthetic resin material, and the frame sheet metal is made of a metal material. As the pedestal and the frame sheet metal are made of different materials, a difference in the acoustic impedance is produced between the pedestal and the frame sheet metal.

14 Claims, 11 Drawing Sheets (51) Int. Cl.
*H04N 1/00* (2006.01)
*G10K 11/162* (2006.01)
*G01S 15/04* (2006.01)
*G10K 11/00* (2006.01)

(52) U.S. Cl.
CPC ......... *G03G 15/5016* (2013.01); *G03G 15/80* (2013.01); *G10K 11/004* (2013.01); *G10K 11/162* (2013.01); *H04N 1/00885* (2013.01); *H04N 1/00896* (2013.01); *H04N 2201/0094* (2013.01)

(58) Field of Classification Search
CPC ....... G01S 15/04; G01S 15/88; G10K 11/004; G10K 11/02; G10K 11/162; G01D 11/30; G01D 11/305
USPC ...... 399/1, 38, 75, 82, 88, 411; 73/587, 589, 73/632, 645, 662, 663
See application file for complete search history.

(56) References Cited

U.S. PATENT DOCUMENTS

2008/0232197 A1* 9/2008 Kojima .................. G01S 7/521
367/99
2014/0092416 A1* 4/2014 Ogata ..................... G01S 17/08
358/1.14

\* cited by examiner

| MEMBER | DENSITY (kg/m³) | SPEED OF SOUND (m/sec) | ACOUSTIC IMPEDANCE (kg/m²sec *10⁻⁶) |
|---|---|---|---|
| AIR | 1.2×10-4 | 344 | 0.0004 |
| WATER | 1000 | 1480 | 1.48 |
| IRON | 7860 | 5500 | 45.6 |
| COPPER | 8960 | 5010 | 44.6 |
| ALUMINUM | 2690 | 6420 | 17.3 |
| LEAD | 11300 | 1960 | 22.4 |
| WOOD | 300 TO 800 | 3500 TO 4500 | 1.05 TO 3.6 |
| POLYETHYLENE | 10810 | 2200 | 2.12 |
| ACRYL | 1190 | 2600 | 3.27 |
| POLYCARBONATE | 1200 | 2200 | 2.65 |
| PET | 2338 | 2280 | 2.92 |
| HARD POLYVINYL CHLORIDE | 2299 | 2170 | 3.16 |
| POLYPROPYLENE | 910 | 2500 | 2.38 |
| ABS | 1070 | 2150 | 2.30 |
| DURACON | 1410 | 2250 | 3.20 |
| SOFT POLYVINYL CHLORIDE | 1400 | — | — |

*MOLD IS MIXED MATERIAL OF POLYCARBONATE AND ABS
ACOUSTIC IMPEDANCE IS APPROXIMATELY 2.45

ELECTRONIC DEVICE HAVING
SUBSTRATE MOUNTING SONIC WAVE
OUTPUT ELEMENT THAT OUTPUTS AND
RECEIVES SONIC WAVE, PEDESTAL TO
WHICH THE SUBSTRATE IS ATTACHED
MADE OF A NONCONDUCTIVE MATERIAL,
FRAME TO WHICH THE PEDESTAL IS
ATTACHED MADE OF A CONDUCTIVE
MATERIAL, AND CONDUCTIVE TAPE OR
CONDUCTIVE LEAF SPRING WHICH
CONTACTS SUBSTRATE AND FRAME

BACKGROUND

Field

The present disclosure relates to an electronic device including a sonic wave output element that outputs a sonic wave, a method for controlling shifting an electronic device between power states, and a computer-readable storage medium storing computer executable instructions for causing a computer to execute a method for shifting an electronic device between power states.

Description of the Related Art

Nowadays, an image forming apparatus is provided with a function of a power saving mode in order to reduce power consumption while the image forming apparatus is not being used by a user. However, if the image forming apparatus is in the power saving state, it can take time to resume operations when the image forming apparatus is to be used. In order to address this, an image forming apparatus has been provided with a human presence sensor so that the image forming apparatus can automatically resume upon a user approaching the image forming apparatus that is in the power saving mode.

There is a variety of human presence sensors that can be provided in the image forming apparatus, including a pyroelectric sensor and an infrared array sensor. One of such sensing units is an ultrasonic wave sensor (refer to Japanese Patent Laid-Open No. 2015-195548). An ultrasonic wave sensor is a type of range finding sensors. The ultrasonic wave sensor generates an ultrasonic wave and measures the distance based on the time it takes for the reflection wave reflected by an object to return to the ultrasonic wave sensor.

An ultrasonic wave sensor is used in an image forming apparatus as follows. Specifically, when the power state of the image forming apparatus is in a power saving state, the proximity of a person is determined based the time it takes for the reflection wave of an ultrasonic wave to return, and the image forming apparatus resumes from the power saving state to enter a standby state. For example, if the time it takes for the reflection wave to return is no greater than a set time, an operation to cause the image forming apparatus to resume from the power saving state to enter the standby state is carried out.

The ultrasonic wave sensor has directionality. Therefore, when the ultrasonic wave sensor mounted in an image forming apparatus, the orientation of the ultrasonic wave sensor needs to be adjusted such that the ultrasonic wave sensor can detect a user in the vicinity of the operation unit to which the user approaches when the image forming apparatus is used.

An ultrasonic wave sensor carries out detection by transmitting and receiving a sonic vibration. This can result in a possibility that accuracy of the detection can decrease due to affects by an unwanted sonic vibration.

An ultrasonic wave sensor outputs an ultrasonic wave and detects the presence of an object by detecting the reflection wave of the ultrasonic wave. Therefore, in the case of using an ultrasonic wave sensor as a human presence sensor, depending on how the ultrasonic wave sensor is installed, resonance or reverberation of sound is input to a human presence sensor. This can lead to a situation in which an input cannot be detected accurately as to whether the input is from the reflection wave or from noise such as reverberation. In order to prevent an occurrence of such a situation, an ultrasonic wave sensor needs to be installed in a configuration in which reverberation does not occur.

When an ultrasonic wave sensor is fixed, a vibration caused by an ultrasonic wave is transmitted to a fixing portion from a substrate on which the ultrasonic wave sensor is mounted, and the vibration is reflected by a sheet metal end or the like and returns, causing reverberation to occur. This reverberation reduces the detection accuracy of the ultrasonic wave sensor.

In other words, an electronic device, such as an image forming apparatus, which uses a sonic wave sensor, such as an ultrasonic wave sensor, to detect a person or an object can experience a reduction in the accuracy of the detection.

SUMMARY

Aspects of the present disclosure are directed to providing a mechanism that prevents a vibration generated by a sonic wave sensor from being transmitted to a frame sheet metal or the like that fixes a substrate on which the sonic wave sensor is mounted, that suppresses a malfunction caused by reverberation (sonic wave diffuse reflection) to the sonic wave sensor, and that enables obtaining a clear detection sensitivity even at a close range.

The present disclosure provides an electronic device including a substrate on which a sonic wave output element that outputs a sonic wave and receives the sonic wave is mounted, a pedestal to which the substrate is attached, and a frame to which is the pedestal is attached. The pedestal is made of a material with an acoustic impedance different from an acoustic impedance of a material of the frame.

Further features will become apparent from the following description of exemplary embodiments with reference to the attached drawings.

DESCRIPTION OF THE EMBODIMENTS

Hereinafter, exemplary embodiments will be described in detail with reference to the drawings.

First Exemplary Embodiment

Figure 1:
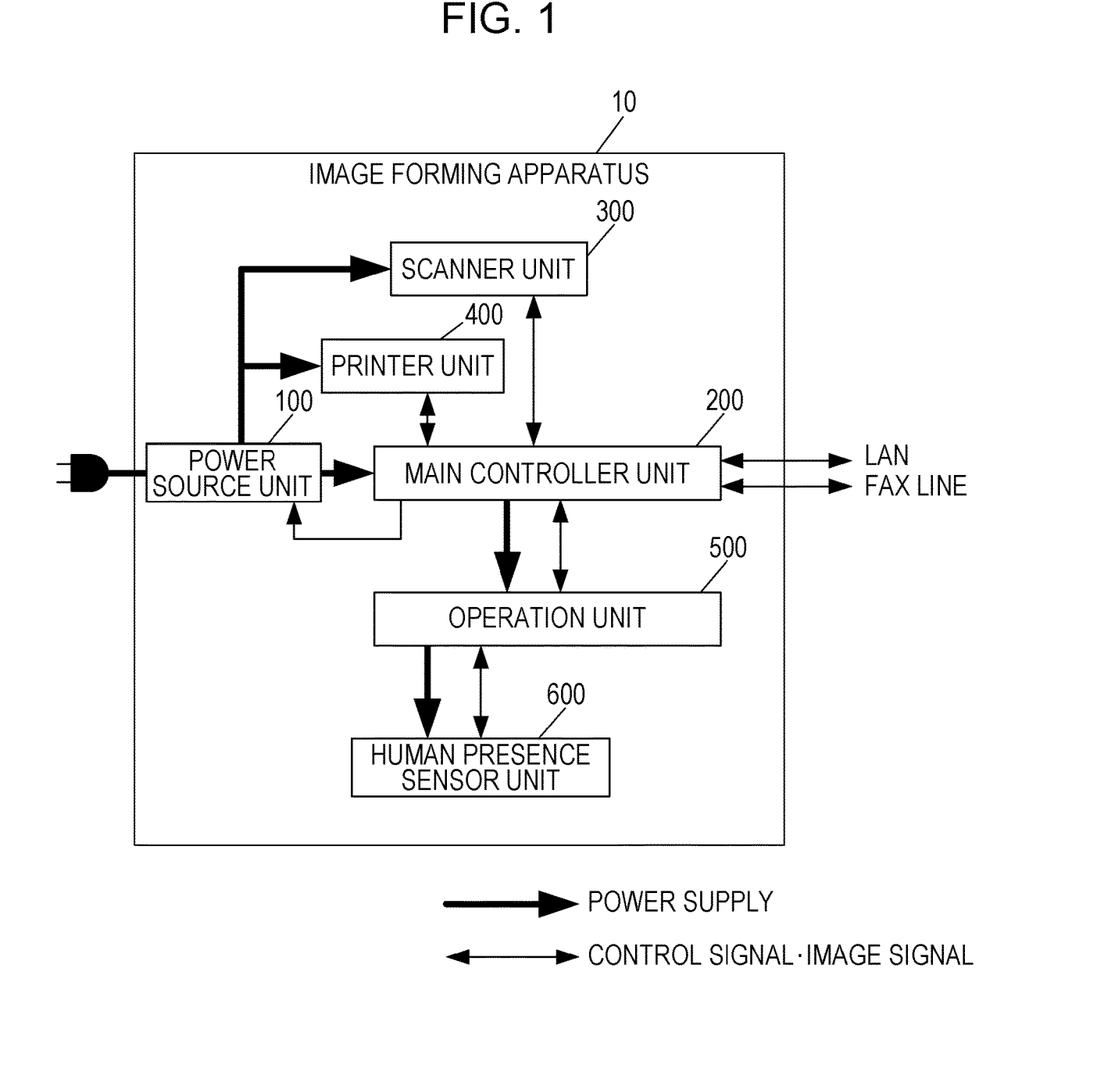
FIG. 1 is a block diagram illustrating a schematic configuration of an image forming apparatus according to an exemplary embodiment.

FIG. 1 is a block diagram illustrating a schematic configuration of an image forming apparatus 10, which illustrates an exemplary embodiment.

The image forming apparatus 10 is a multifunction peripheral (MFP) provided with a plurality of functions, including a printer function, a scanner function, a copier function, and a fax function. The image forming apparatus 10 includes a power source unit 100, a main controller unit 200, a scanner unit 300, a printer unit 400, an operation unit 500, and a human presence sensor unit 600. The human presence sensor unit 600 detects a person with an ultrasonic wave sensor, which will be described below with reference to FIG. 3.

The main body of the image forming apparatus 10 includes at least two power modes, a normal operation power mode in which a copying operation and so on are carried out and a power saving mode in which less power is consumed than in the normal operation power mode.

When the image forming apparatus 10 is in the normal operation power mode and is left unused for a predetermined period of time, the main controller unit 200 controls the power source unit 100 to shift the power mode of the image forming apparatus 10 to the power saving mode. When the image forming apparatus 10 is in the power saving mode, power supply to the scanner unit 300, the printer unit 400, and so on is shut off, and power supply to a portion inside the main controller unit 200 and an unused portion inside the operation unit 500 is shut off.

Even when the image forming apparatus 10 is in the power saving mode, the human presence sensor unit 600 is in operation and causes the image forming apparatus 100 to transition from the power saving mode to the normal operation power mode upon detecting a user's presence in the vicinity of the image forming apparatus 10. Upon detecting a person, the human presence sensor unit 600 transmits a detection signal to the operation unit 500. Then, the operation unit 500 notifies the main controller unit 200 of the detection, and the main controller unit 200 controls the power source unit 100 to shift the power mode of the apparatus to the normal operation power mode.

Figure 2:
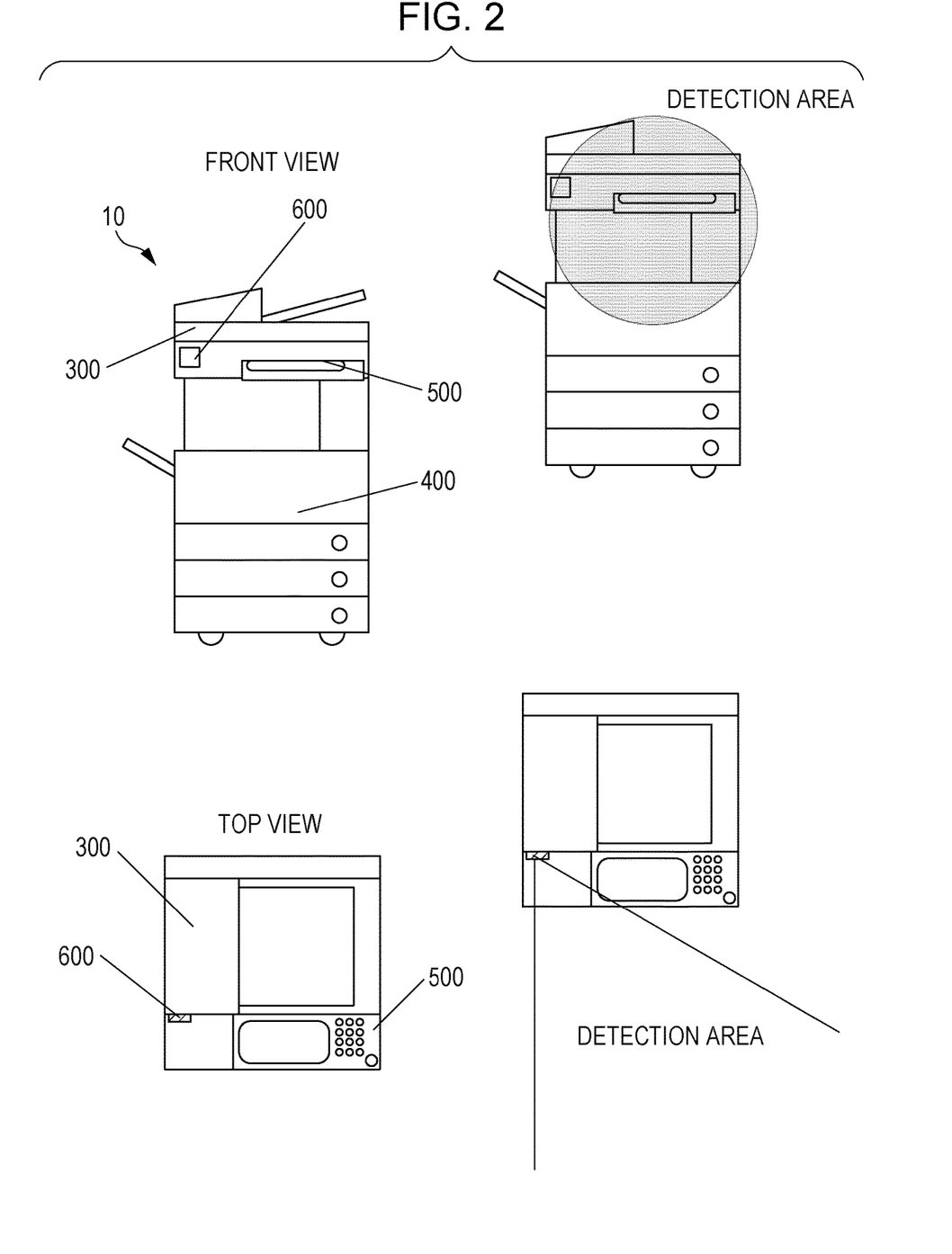
FIG. 2 illustrates a detection area of a human presence sensor unit.

FIG. 2 illustrates a detection area of the human presence sensor unit 600.

The human presence sensor used in the image forming apparatus 10 is an ultrasonic wave sensor, and the ultrasonic wave sensor outputs an ultrasonic wave and receives the ultrasonic wave that has hit an object and been reflected thereby. The ultrasonic wave sensor can estimate the distance to the object based on the time it takes to receive the reflected ultrasonic wave. The image forming apparatus 10 sets the detection area of the human presence sensor to be oriented slightly toward the operation unit 500 from the image forming apparatus 10 and slightly downward so that an ultrasonic wave reflected by a person's body can be detected.

The detection area of the human presence sensor unit 600 is set such that the reflection wave from a person located up to approximately 2 meters away from the main body of the image forming apparatus 10 can be detected. In addition, a person present within a region with the same width as the width of the main body of the image forming apparatus 10 can be detected at a position that is 30 cm in front of the main body of the image forming apparatus 10. The human presence sensor unit 600 can have a greater detection range when attached to the image forming apparatus 10 at a possibly higher position, and is thus attached to the scanner unit 300 in the present exemplary embodiment.

Figure 3:
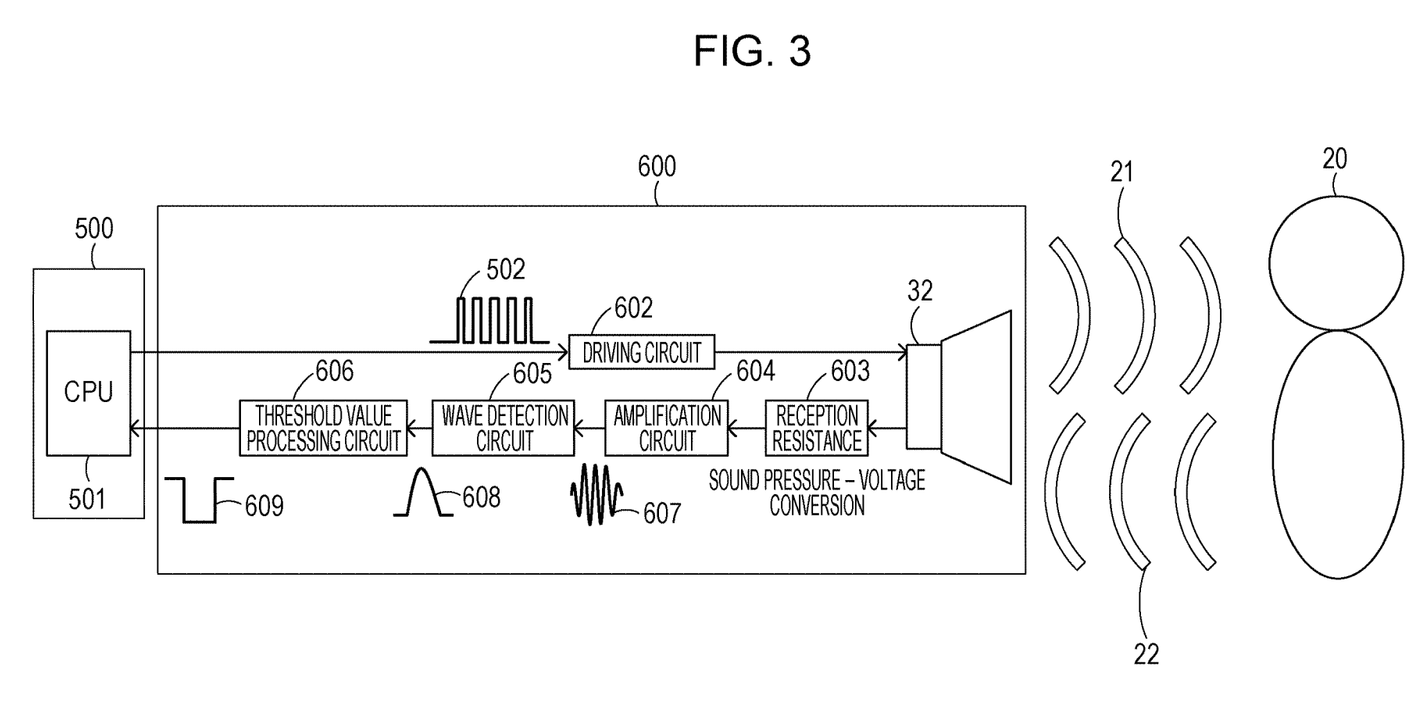
FIG. 3 illustrates a configuration of a human presence sensor unit.

FIG. 3 illustrates a configuration of the human presence sensor unit 600. The human presence sensor unit 600 includes an ultrasonic wave sensor 32, a driving circuit 602, a reception resistance 603, an amplification circuit 604, a wave detection circuit 605, and a threshold value processing circuit 606 and is a human detection unit in which the aforementioned components are mounted on a substrate.

The driving circuit 602 receives an input of a driving pulse 502 from a central processing unit (CPU) 501 in the operation unit 500, and operates to cause the ultrasonic wave sensor 32 to output an ultrasonic wave. In response thereto, the ultrasonic wave sensor 32 outputs an ultrasonic wave 21 toward the detection area illustrated in FIG. 2.

Figure 4A:
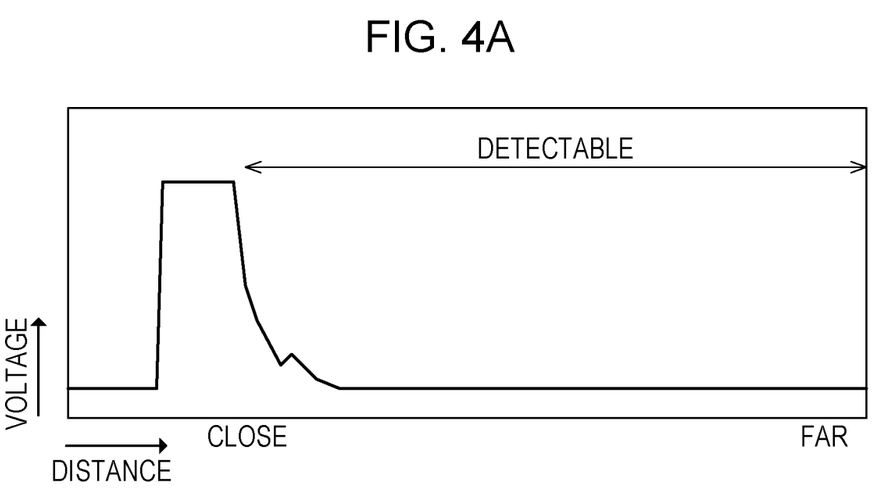
FIGS. 4A and 4B are illustrations for describing the difference in the waveform associated with the presence or the absence of reverberation when an ultrasonic wave is output.
Figure 4B:
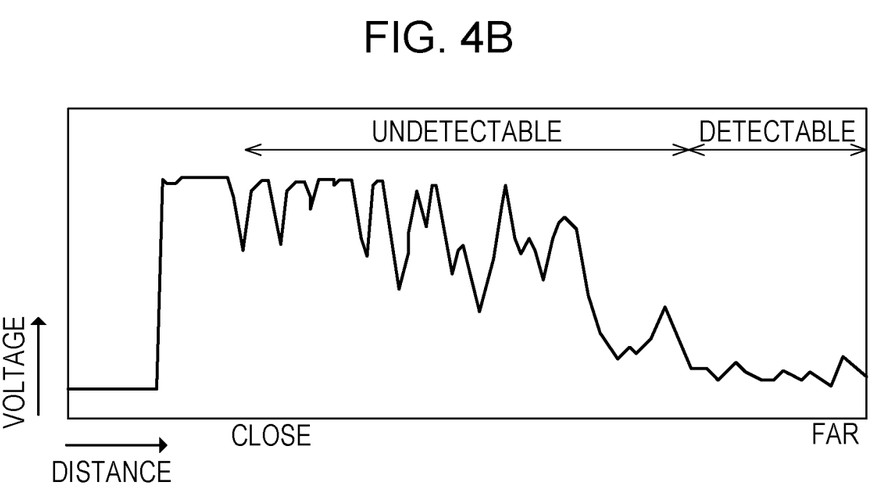

The ultrasonic wave 21 output from the ultrasonic wave sensor 32 is reflected by a person 20, and a reflection wave 22 is input to the ultrasonic wave sensor 32. The reflection wave 22 input to the ultrasonic wave sensor 32 is converted from sound pressure to voltage by the reception resistance 603. The reflection wave converted to the voltage is amplified by the amplification circuit 604 to result in a waveform, as in an analog waveform 607. The analog waveform 607 passes through the wave detection circuit 605 to be converted from a waveform with a large variation to a smooth waveform 608. FIGS. 4A and 4B, as described below, illustrate examples of the waveforms obtained based on the analog waveform 607 passing through the wave detection circuit 605. Then, it is determined whether the waveform input to the threshold value processing circuit 606 is higher or lower than the set voltage level, and a determination waveform 609, which is the result of the stated determination, is transmitted to the CPU 501 in the operation unit 500.

FIGS. 4A and 4B are illustrations for describing the difference in the waveform associated with the presence or the absence of reverberation in a case in which the ultrasonic wave sensor 32 has output an ultrasonic wave in a state in which a reflecting object is not present in front of (within the detection area of) the human presence sensor unit 600.

FIG. 4A illustrates the waveform obtained when a frame is made of metal and an angle adjusting pedestal is made of resin. FIG. 4B illustrates the waveform obtained when a frame and an angle adjusting pedestal are both made of metal.

The waveforms are observed at a point after the waveforms have passed the wave detection circuit 605 of the human presence sensor unit 600.

The case illustrated in FIG. 4A, in which the frame is made of metal and the angle adjusting pedestal is made of resin, reveals that no influence of reverberation is observed, the voltage level is stable at a lower level, and an object can be detected even in a close range.

The case illustrated in FIG. 4B, in which the frame and the angle adjusting pedestal are both made of metal, reveals that an influence of reverberation is observed, the voltage level fluctuates greatly in a close range portion, making it difficult to determine whether the fluctuation is due to the reflection wave from an object or due to noise caused by reverberation, and an object cannot be detected within this range.

FIGS. 5A, 5B, 5C, and 5D are schematic diagrams for describing how reverberation is transmitted and attenuated when an ultrasonic wave is output.

Figure 5A:
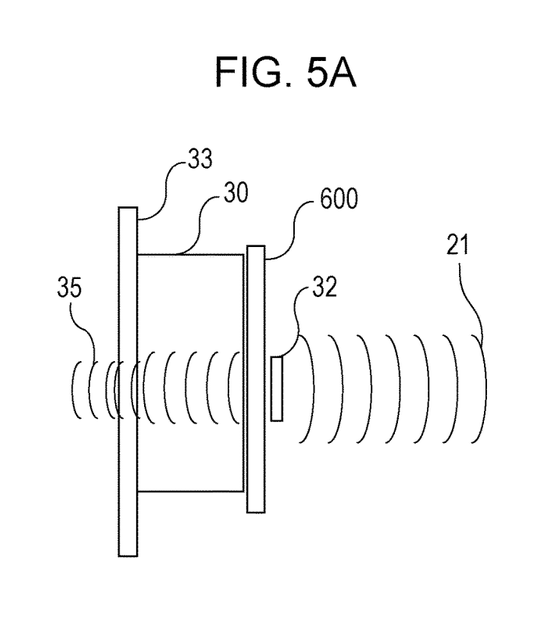
FIGS. 5A, 5B, 5C, and 5D are illustrations for describing how reverberation is transmitted and attenuated when an ultrasonic wave is output.

FIG. 5A illustrates the state in which the ultrasonic wave sensor 32 has output the ultrasonic wave 21. In addition, FIG. 5A illustrates that, at the same time as the output of the ultrasonic wave 21, the sonic wave vibration of a reverberation factor 35 is also transmitted to an angle adjusting pedestal 30 and a frame sheet metal 33.

Figure 5B:
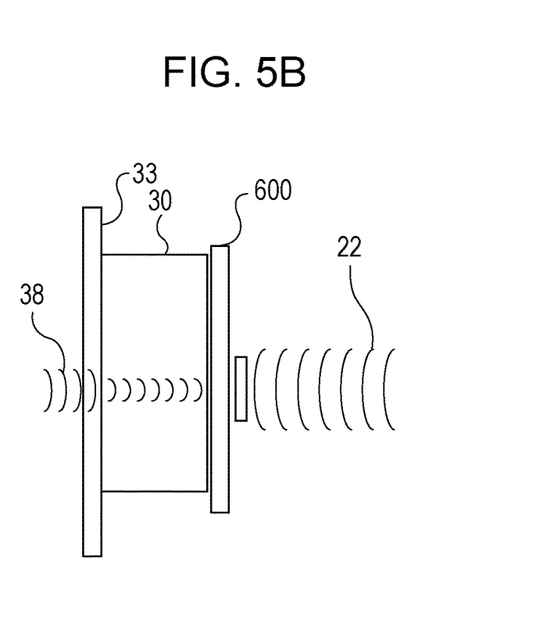

FIG. 5B illustrates the state in which the ultrasonic wave 21 has hit an object and the reflection wave 22 is input to the ultrasonic wave sensor 32. In addition, FIG. 5B illustrates that, at the same time as the input of the reflection wave 22, the reverberation factor 35 transmitted to the frame sheet metal 33 has returned as reverberation 38. The angle adjusting pedestal 30 illustrated in FIGS. 5A and 5B is made of a synthetic resin material.

Figure 5C:
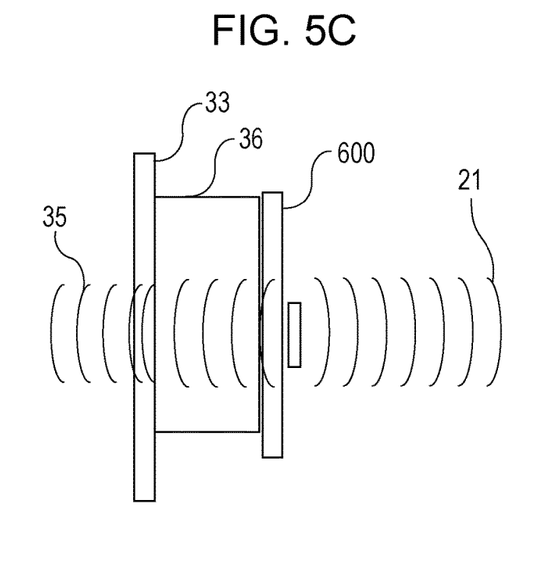
Figure 5D:
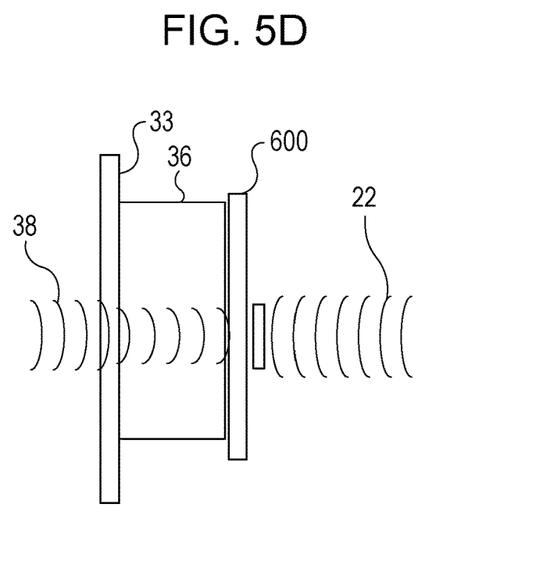

FIGS. 5C and 5D illustrate how reverberation is transmitted when the angle adjusting pedestal is made of a material different from the material of the angle adjusting pedestal 30 illustrated in FIGS. 5A and 5B. An angle adjusting pedestal 36 illustrated in FIGS. 5C and 5D is made of a metal material.

The length of the lines for each of the ultrasonic wave 21, the reverberation factor 35, and the reverberation 38 indicates the intensity of the sound pressure and indicates that the reverberation factor 35 and the reverberation 38 have a greater sound pressure in the case of the angle adjusting pedestal 36 (metal material) than in the case of the angle adjusting pedestal 30 (synthetic resin material).

Figure 6:
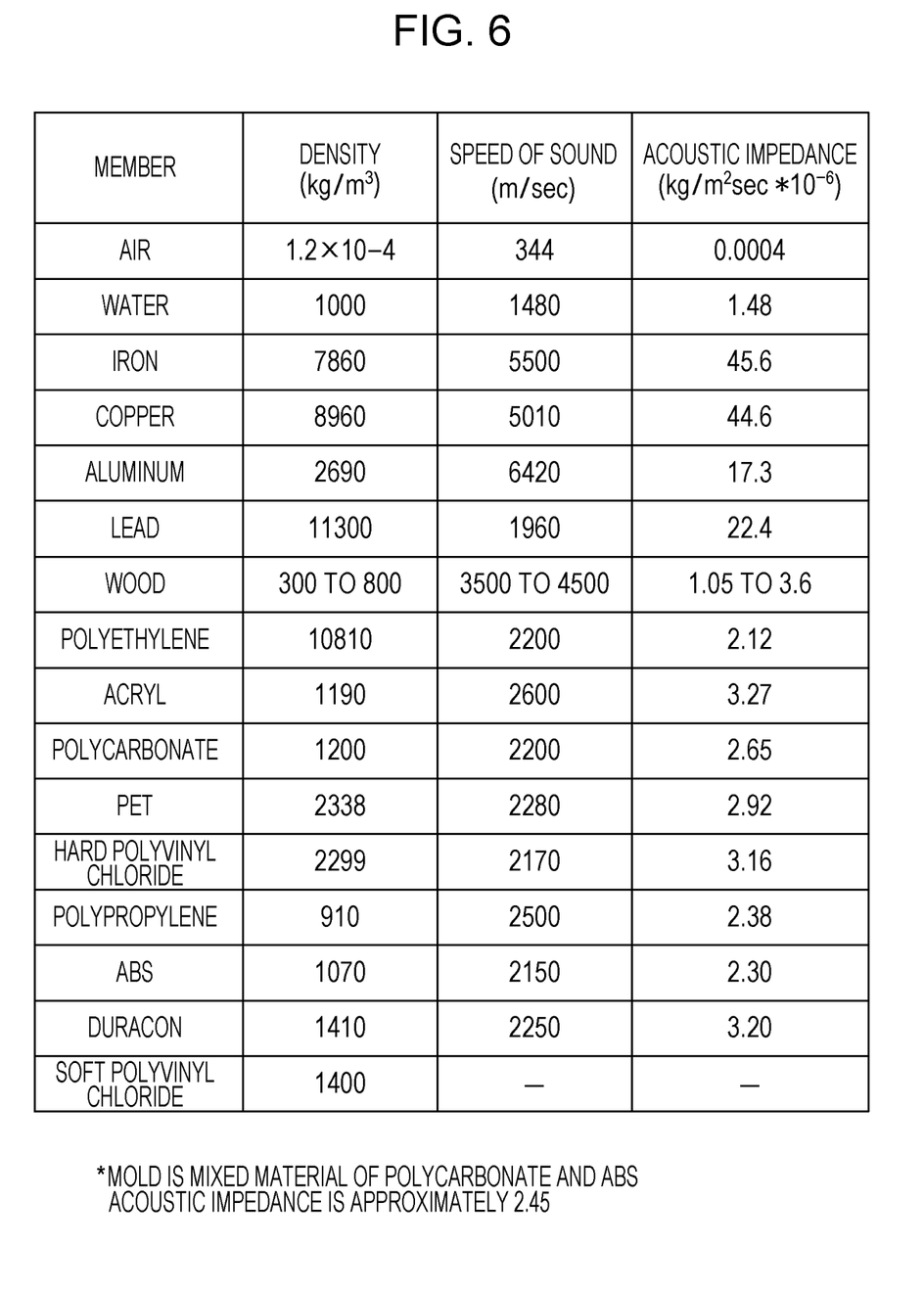
FIG. 6 is a table summarizing the acoustic impedances of representative materials.

FIG. 6 is a table summarizing the acoustic impedances of some representative materials. The acoustic impedance is approximately expressed by the following expression:

$$\text{acoustic impedance (kg/m}^2 \text{ sec}*10^{-6}\text{): speed of sound (m/sec)} \times \text{density (kg/m}^3\text{)}$$

The values in the table are referential values since differences arise depending on the surrounding environment, such as the temperature.

An acoustic vibration wave such as an ultrasonic wave output from an ultrasonic wave sensor has characteristics that the sonic vibration wave is gradually attenuated while travelling through a substance and the amplitude and the intensity (sound pressure) decrease. In particular, it is known that, when the sonic vibration is transmitted between different members, the attenuation of the sound caused by diffusion, scattering, and/or reflection at an interface is greater as the difference in the acoustic impedance (speed of sound×density) unique to each substance is greater between the members.

FIG. 6 illustrates that metal materials, such as iron and copper, have a greater acoustic impedance, and synthetic resin materials, such as ABS, acryl, and PET, have a smaller acoustic impedance.

As illustrated, the attenuation is reduced when a metal material and another metal material are connected since the difference in the acoustic impedance between these materials is small. The attenuation is increased when a metal material and a synthetic resin material are connected, since the difference in the acoustic impedance between these materials is large.

The attenuation of the reverberation factor is greater in the connection of the angle adjusting pedestal 30 with the frame sheet metal 33 than in the connection of the angle adjusting pedestal 36 with the frame sheet metal 33, with regard to the angle adjusting pedestal 30 (synthetic resin material) and the angle adjusting pedestal 36 (metal material) in the configurations illustrated in FIGS. 5A to 5D.

Figure 7A:
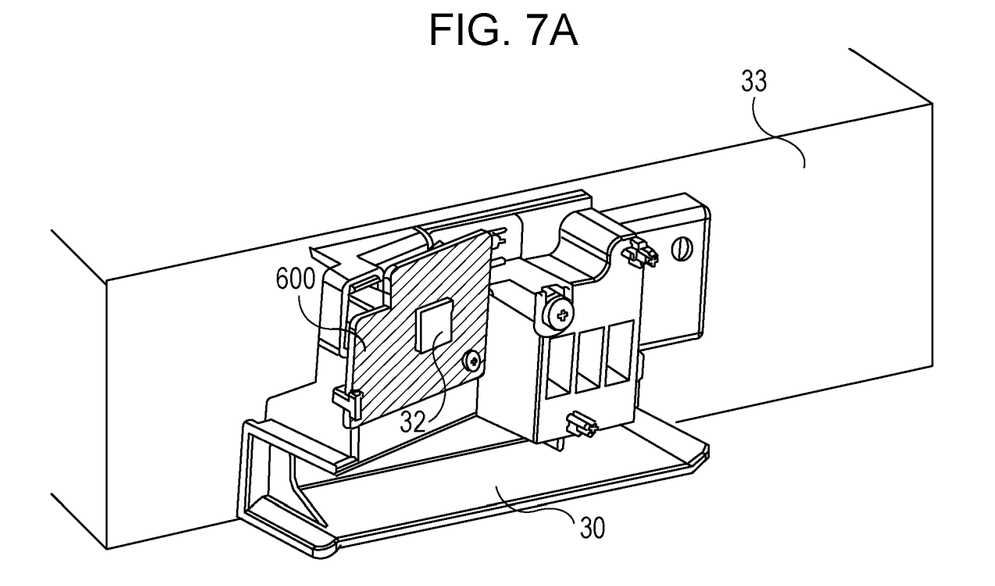
FIGS. 7A and 7B illustrate the state in which a human presence sensor unit is attached to a frame sheet metal.
Figure 7B:
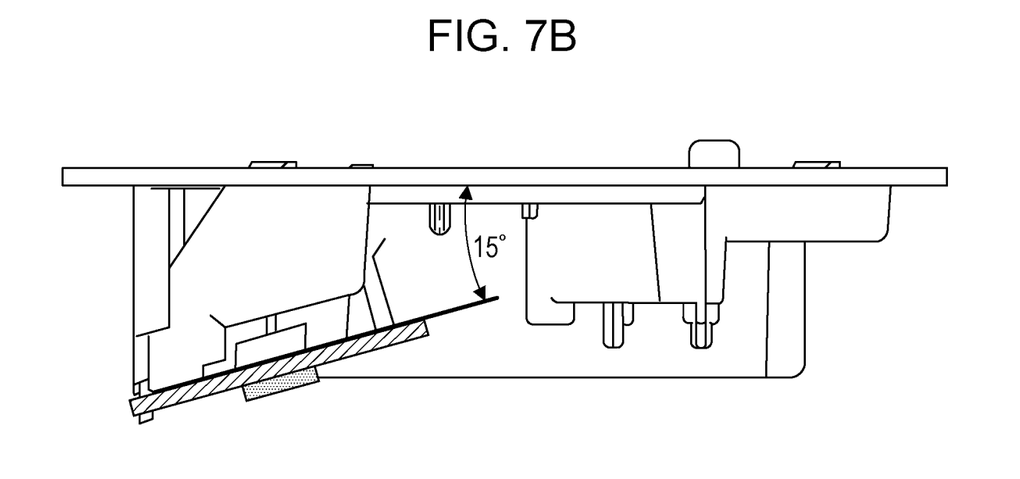

FIGS. 7A and 7B illustrate the state in which the human presence sensor unit 600 is attached to the frame sheet metal 33 of the scanner unit 300 of the image forming apparatus 10 according to the present exemplary embodiment. FIG. 7A is an illustration as viewed diagonally from the front and FIG. 7B is an illustration as viewed from above.

The human presence sensor unit 600 is angled at 15 degrees so that the detection area of the human presence sensor unit 600 is oriented toward the operation unit 500 of the image forming apparatus 10. This angle is not limiting and is merely an example.

Figure 8:
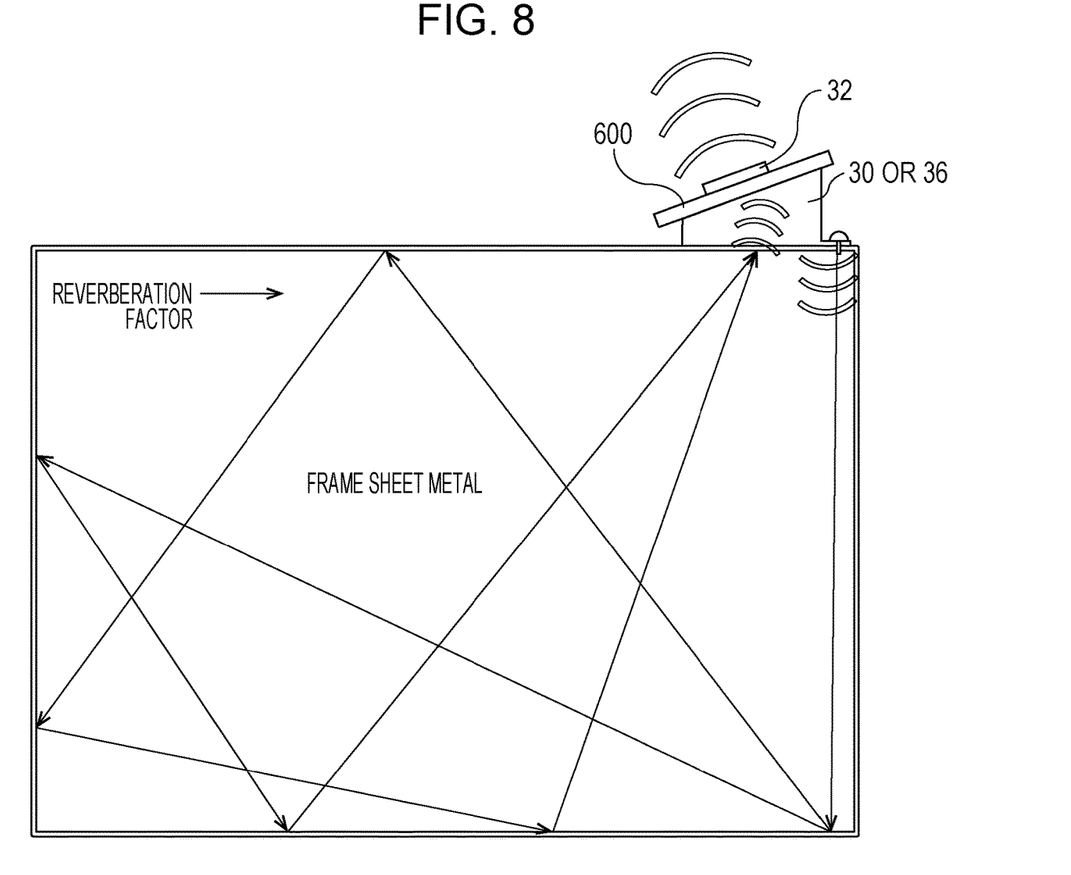
FIG. 8 is a schematic diagram illustrating how a reverberation factor results in reverberation and reaches a human presence sensor.

FIG. 8 is a schematic diagram illustrating the state in which the human presence sensor unit 600 fixed to the frame sheet metal 33 outputs an ultrasonic wave, a reverberation factor undergoes diffuse reflection inside the frame sheet metal 33 via the portion at which the human presence sensor unit 600 is fixed to the frame sheet metal 33, and the reverberation factor returns to the human presence sensor unit 600.

The present exemplary embodiment will now be described based on the configurations illustrated in FIGS. 1 to 8.

When Angle Adjusting Pedestal 30 is Made of Mold Material

The ultrasonic wave sensor 32 in the human presence sensor unit 600 mounted in the image forming apparatus 10 generates an ultrasonic wave. As illustrated in FIG. 5A, the ultrasonic wave 21 is transmitted in the forward direction from the image forming apparatus 10. At the same time, the reverberation factor 35 is transmitted to the scanner unit 300 via the human presence sensor unit 600 and the angle adjusting pedestal 30. The reverberation factor 35 transmitted to the scanner unit 300 is reflected via a variety of paths inside the frame sheet metal 33 as illustrated in FIG. 8, and is again input to the ultrasonic wave sensor 32 in the human presence sensor unit 600 as the reverberation 38 via the angle adjusting pedestal 30 as illustrated in FIG. 5A.

At this point, the acoustic impedance of the human presence sensor unit 600 is 44.6 (kg/m$^2$ sec*10$^{-6}$), the acoustic impedance of the angle adjusting pedestal 30 or the mold is 2.45 (kg/m$^2$ sec*10$^{-6}$), and the acoustic impedance of the frame sheet metal 33 is 45.6 (kg/m$^2$ sec*10$^{-6}$). The substrate pattern of the human presence sensor unit 600 is formed of copper, and thus the acoustic impedance of copper is indicated to represent the acoustic impedance of the human presence sensor unit 600.

When the angle adjusting pedestal 30 is made of a mold material, the difference in the acoustic impedance is large at each interface, and thus the reverberation factor 35 is attenuated greatly as the reverberation factor 35 passes through each interface. Therefore, the ultrasonic wave sensor 32 can ignore the reverberation 38, and obtains a waveform that facilitates the detection of a reflecting object as illustrated in FIG. 4A. Accordingly, the human presence sensor unit 600 can detect a person in a close range with high accuracy.

When Angle Adjusting Pedestal 36 is Made of Iron

The acoustic impedance of the human presence sensor unit 600 is 44.6 (kg/m$^2$ sec*10$^{-6}$), the acoustic impedance of the angle adjusting pedestal 36 or iron is 45.6 (kg/m$^2$ sec*10$^{-6}$), and the acoustic impedance of the frame sheet metal 33 is 45.6 (kg/m$^2$ sec*10$^{-6}$), and these values are very close to one another.

When the angle adjusting pedestal 36 is made of iron, less attenuation occurs at each interface, and thus the reverberation 38 is input to the ultrasonic wave sensor 32 as a large reflection wave. Accordingly, the waveform such as the one illustrated in FIG. 4B is obtained, which makes it difficult to detect a person in a close range.

As described above, as the human presence sensor unit 600 is fixed to the image forming apparatus 10 with a composite member having a different acoustic impedance interposed therebetween, the reverberation factor 35 or the reverberation, which is a noise component to the ultrasonic wave sensor 32, can be attenuated greatly. With this configuration, the reverberation is no longer recognized as the reflection wave 22, and the clear sensitivity can be obtained even in a close range of the ultrasonic wave sensor 32. As a result, a person approaching the image forming apparatus 10 can be detected in a close range with high accuracy.

Second Exemplary Embodiment

A sonic vibration wave such as an ultrasonic wave output from an ultrasonic wave sensor has characteristics that the sonic vibration wave is attenuated gradually while travelling through a substance and the amplitude and the intensity (sound pressure) decrease. As illustrated in the first exemplary embodiment, in particular, it is known that, when the sonic vibration is transmitted between different members, the attenuation of the sound caused by diffusion, scattering, and/or reflection at an interface is greater as the difference in the acoustic impedance (speed of sound×density) unique to each substance is greater between the members. In other words, by fixing the ultrasonic wave sensor with a plurality of members having different acoustic impedances as illustrated in the first exemplary embodiment described above, the deterioration in the detection level of the ultrasonic wave sensor caused by a sonic vibration (reverberation) from an unexpected direction can be reduced.

In order to prevent the deterioration in the detection level of the ultrasonic wave sensor, the ultrasonic wave sensor needs to be disposed so as not to be affected by a vibration from itself or from its surroundings. For example, if the ultrasonic wave sensor is connected to a metal pedestal or a sheet metal, the sonic vibration of the ultrasonic wave sensor is transmitted to result in reverberation, which makes it very likely to cause the detection level to decrease. Thus, the deterioration in the detection level of the ultrasonic wave sensor caused by reverberation can be reduced when the ultrasonic wave sensor is fixed with a pedestal made of a synthetic resin material or the like.

The method in which the ultrasonic wave sensor is fixed with a pedestal made of a synthetic resin material or the like can counter deterioration of the detection level due to reverberation. However, a pedestal made of a synthetic resin material is barely conductive, and thus, the ultrasonic wave sensor and the ground (GND) are connected only with a flux line for controlling the ultrasonic wave sensor. Thus, GND is likely to be unstable, leading to a state that is very susceptible to static electricity.

If the ultrasonic wave sensor is to be installed at a location outside the reach of a person, it need not be fixed. In the case of an apparatus with which a person can come into contact with, such as the image forming apparatus, the ultrasonic wave sensor needs to be fixed. However, if the ultrasonic wave sensor is fixed with a pedestal made of a synthetic resin material, static electricity either cannot be released or can only be released through the control flux line connected to the CPU. Thus, static electricity flows into the CPU via the ultrasonic wave sensor and the control flux line, which can affect the ultrasonic wave sensor or the CPU.

With a configuration in which the ultrasonic wave sensor is not fixed, the detection range varies, and this configuration is not suitable for an apparatus where the detection range is to be restricted. Thus, when the ultrasonic wave sensor is installed in the image forming apparatus, a configuration that can reduce reverberation caused by the vibration being transmitted to the pedestal or the frame sheet metal and that can also enhance the connection to the GND to take measures against static electricity is needed. Hereinafter, this configuration will be described.

FIGS. 9A, 9B, 9C, and 9D are schematic diagrams for describing how a current is transmitted when static electricity is applied to the human presence sensor unit 600.

In FIGS. 9A to 9D, an angle adjusting pedestal 30 is formed of a synthetic resin material, which generally has very poor conductivity (nonconductive material). The frame sheet metal 33 is a sheet metal of the scanner unit 300 of the image forming apparatus 10, and is made of a metal material having good conductivity (conductive material).

Figure 9A:
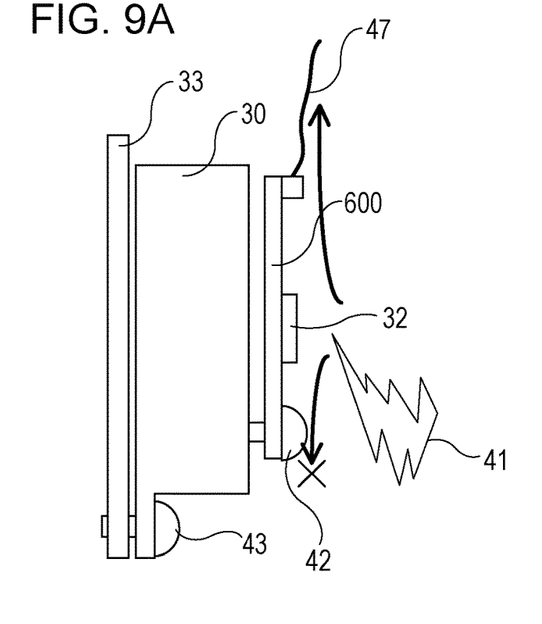
FIGS. 9A, 9B, 9C, and 9D are illustrations for describing how a current is transmitted when static electricity is applied to a human presence sensor unit.

As illustrated in FIG. 9A, reference numeral 41 denotes static electricity. A screw 42 fixes the human presence sensor unit 600 to the angle adjusting pedestal 30. A screw 43 fixes the angle adjusting pedestal 30 to the frame sheet metal 33. A control flux line 47 connects the human presence sensor unit 600 to the CPU 501.

Figure 9B:
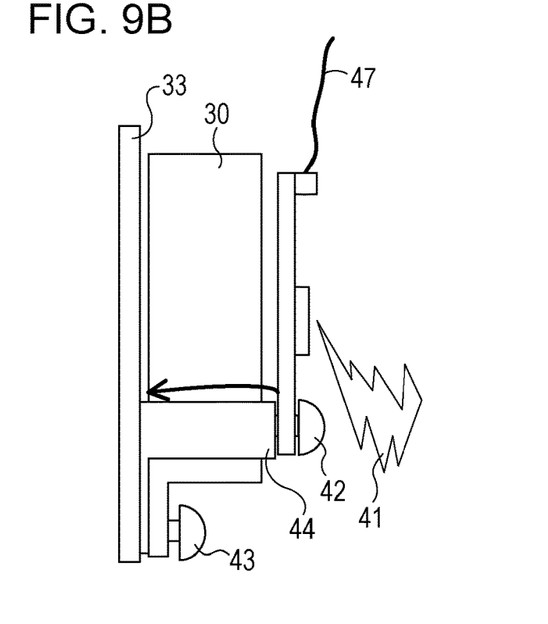

FIG. 9B illustrates a conductive tape 44. The conductive tape 44 enhances the GND connection between the human presence sensor unit 600 and the frame sheet metal 33.

Figure 9C:
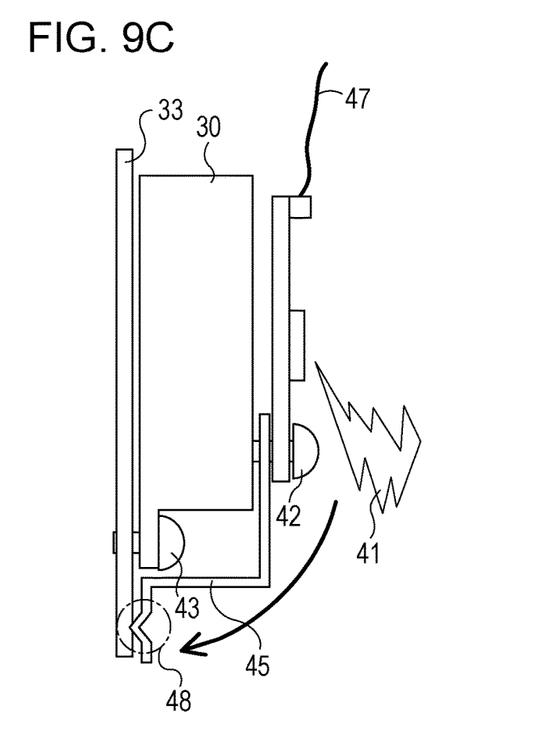

FIG. 9C illustrates a conductive leaf spring 45. The leaf spring 45 has an effect similar to that of the conductive tape 44. The leaf spring 45 is provided with a spring shape portion 48. By making this spring connection portion thinner, the transmission of a vibration between the human presence sensor unit 600 and the frame sheet metal 33 is reduced.

Figure 9D:
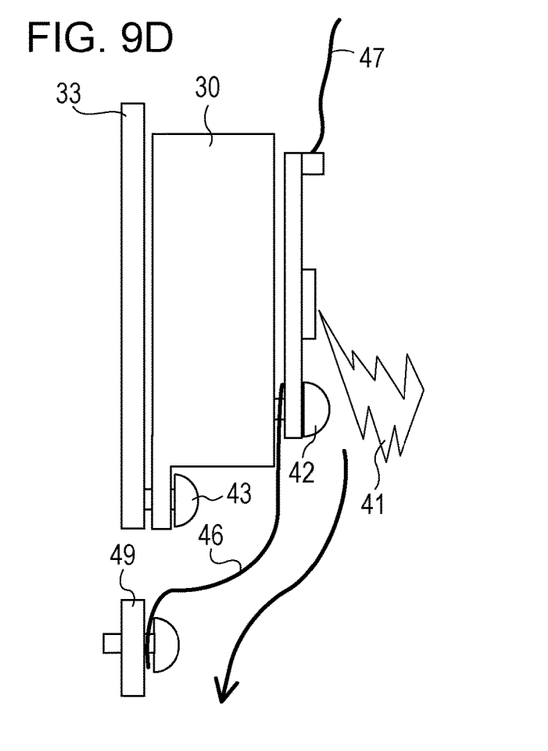

FIG. 9D illustrates a GND enhancing flux line 46. The GND enhancing flux line 46 also has an effect similar to that of the conductive tape 44.

By connecting the human presence sensor unit 600 to GND with either the conductive tape 44 (FIG. 9B), the leaf spring 45 (FIG. 9C), or the GND enhancing flux line 46 (FIG. 9D), the electrical resistance with GND is reduced as compared to the case in which only the control flux line 47 is used.

FIG. 9A illustrates the state in which the human presence sensor unit 600 is connected to GND only with the control flux line 47 connected to the CPU 501. When the static electricity 41 is applied to the human presence sensor unit 600 in this state, the static electricity can be released only through the control flux line 47. Thus, the static electricity flows into the CPU 501 via the control flux line 47, which can affect the CPU 501.

As previously described, FIG. 9B illustrates the state in which the human presence sensor unit 600 is connected to the frame sheet metal 33 with the conductive tape 44. When the static electricity 41 is applied to the human presence sensor unit 600 in this state, the static electricity 41 is released to the frame sheet metal 33 via the conductive tape 44. Thus, the human presence sensor unit 600 and the CPU 501 can both be unaffected by the static electricity.

As previously described, FIG. 9C illustrates the state in which the human presence sensor unit 600 is connected to the frame sheet metal 33 with the leaf spring 45. When the static electricity 41 is applied to the human presence sensor unit 600 in this state, the static electricity 41 is released to the frame sheet metal 33 via the leaf spring 45. By making the spring portion 48 of the leaf spring 45 as thin as possible, the ultrasonic vibration generated by the human presence sensor unit 600 can be prevented from being transmitted to the frame sheet metal 33.

As previously described, FIG. 9D illustrates the state in which the GND enhancing flux line 46 is connected to the human presence sensor unit 600, and the GND enhancing flux line 46 is connected to a frame sheet metal 49 different from the frame sheet metal 33. When the static electricity 41 is applied in this state, the static electricity 41 passes through the GND enhancing flux line 46 and is released to the frame sheet metal 49. By connecting the GND enhancing flux line 46 to the frame sheet metal 49, which is different from the frame sheet metal 33, the ultrasonic vibration can advantageously be made less likely to be transmitted to the frame sheet metal 33.

Figures 10A, 10B:
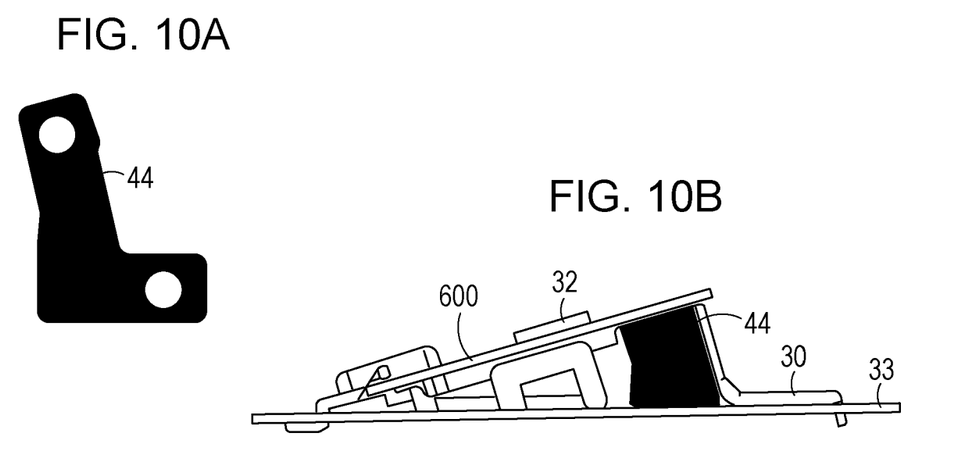
FIGS. 10A, 10B, 10C, 10D, and 10E are illustrations for describing a case in which a GND enhancement measure is taken with a conductive tape.

FIGS. 10A, 10B, 10C, 10D, and 10E illustrate the configuration in the case in which the conductive tape 44 and the angle adjusting pedestal 30 are coupled together as illustrated in FIG. 9B. FIG. 10A is a development of the conductive tape 44.

Figure 10C:
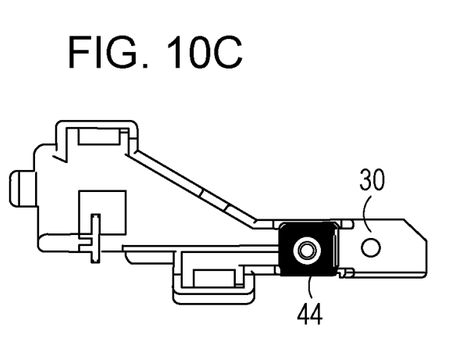
Figure 10D:
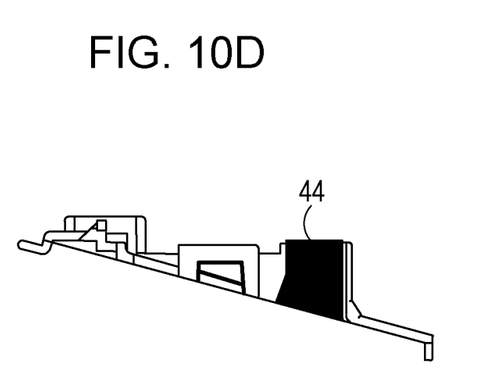
Figure 10E:
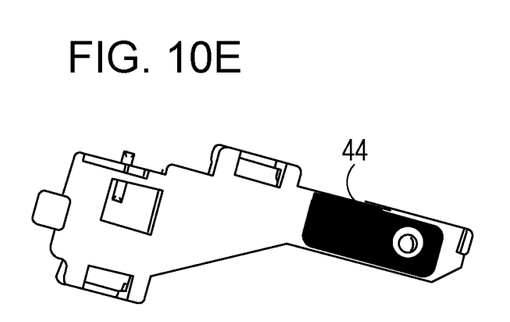

When viewed from the upper surface of the angle adjusting pedestal 30, the conductive tape 44 is affixed to the angle adjusting pedestal 30 as in the solid black portion illustrated in FIG. 10C. When viewed from the side surface of the angle adjusting pedestal 30, the conductive tape 44 is affixed to the angle adjusting pedestal 30 as in the solid black portion illustrated in FIG. 10D. When viewed from the bottom surface of the angle adjusting pedestal 30, the conductive tape 44 is affixed to the angle adjusting pedestal 30 as in the solid black portion illustrated in FIG. 10E.

FIG. 10B is a side view obtained when the angle adjusting pedestal 30 is connected to the frame sheet metal 33. As illustrated in FIG. 10B, the human presence sensor unit 600 is connected at an angle so that the detection area is in the direction of the operation unit 500 of the image forming apparatus 10.

Figure 11A:
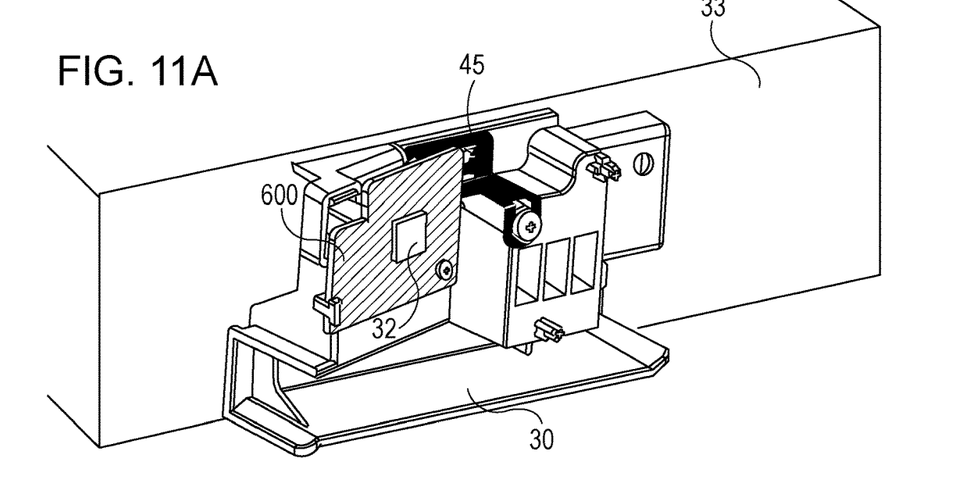
FIGS. 11A, 11B, and 11C are illustrations for describing a case in which a GND enhancement measure is taken with a leaf spring.
Figure 11B:
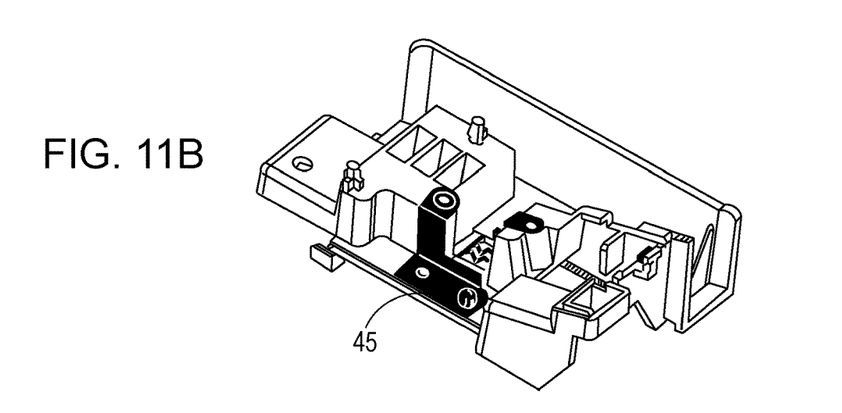
Figure 11C:
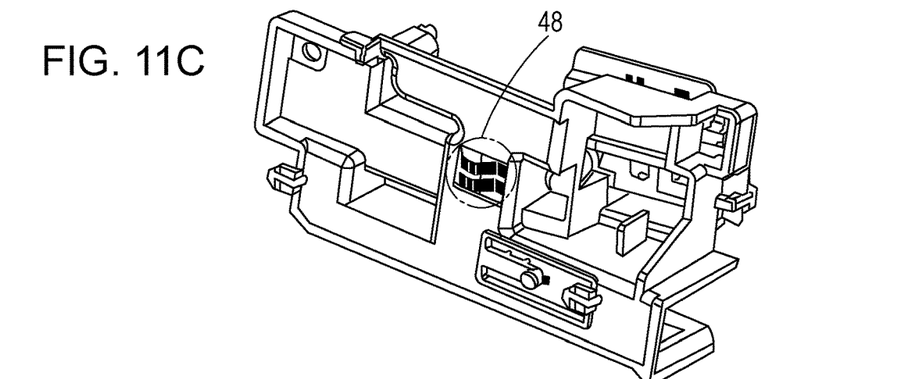

FIGS. 11A, 11B, and 11C illustrate the configuration in which the frame sheet metal 33 of the scanner unit 300 of the image forming apparatus 10 is subjected to the GND enhancement measure with the leaf spring 45 as illustrated in FIG. 9C.

FIG. 11A is an illustration as viewed diagonally from the front with the frame sheet metal 33 being attached. The solid black portion illustrated in FIG. 11A corresponds to the leaf spring 45. FIG. 11B illustrates the connection state of the angle adjusting pedestal 30 and the leaf spring 45. FIG. 11C illustrates the angle adjusting pedestal 30 to which the leaf spring 45 is connected as viewed from the rear side.

The portion enclosed by the broken circle in FIG. 11C is the portion in which the spring portion 48 of the connected leaf spring 45 projects from the hole portion in the angle adjusting pedestal 30, and makes contact with the frame sheet metal 33. When the static electricity 41 is applied to the human presence sensor unit 600, electric charges are released to the frame sheet metal 33 of the image forming apparatus 10 via the leaf spring 45 contacts the human presence sensor unit 600. With this configuration, the static electricity damage to the human presence sensor unit 600 and to the operation unit 500 connected to the human presence sensor unit 600 can be prevented.

The conductive member that electrically connects the ground (GND) of the human presence sensor unit 600 to the frame sheet metal 33 (or 49) to which the pedestal 30 is attached is not limited to those illustrated in FIGS. 9A to 9D above. Any type of conductive member enabling practice of the above-described exemplary embodiments is applicable.

As described thus far, even in the configuration addressing reverberation of the ultrasonic wave sensor as in the first exemplary embodiment, by enhancing GND (GND measure) as described above, the GND level stabilizes, and the apparatus can withstand static electricity. Improvement in the detection performance of the human presence sensor can be expected through the stabilized GND level.

While the above-described exemplary embodiments have been described using an image forming apparatus as an example, apparatus, such as an electronic device in which a substrate on which an ultrasonic wave sensor is mounted in, is applicable. For example, a personal computer (PC) or a consumer electrical appliance, such as an air conditioner or a television set. In other words, it suffices that the configuration be such that the material of a pedestal for fixing a substrate on which a human presence sensor is mounted and a material for a member on the side of an electronic device to which the pedestal is attached have different acoustic impedances.

As described above, by fixing the human presence sensor substrate (ultrasonic wave sensor substrate) with composite members having different acoustic impedances, the ultrasonic wave emitted by the human presence sensor can be attenuated and can thus be prevented from being transmitted to the frame sheet metal or the like of the image forming apparatus or the scanner apparatus. Consequently, the reverberation caused by the frame sheet metal is not input to the human presence sensor, and the clear detection sensitivity can be obtained even in the close range of the human presence sensor. As a result, even in a case in which the motion detection unit needs to be fixed, a person can be stably detected without reducing the detection accuracy, and a person approaching the image forming apparatus or the like can be detected in a close range with high accuracy. Thus, excellent power saving control can be carried out, in which the image forming apparatus can promptly resume from the power saving state upon detecting a user approaching the image forming apparatus or the like with high accuracy and can promptly enter the operable state without the user being left waiting.

By enhancing the GND (grounding measure), as illustrated in the second exemplary embodiment, in the pedestal made of resin or the like as required to address reverberation of the ultrasonic wave sensor, the GND level stabilizes, and an influence of static electricity application can also be suppressed.

The angle adjusting pedestal 30 can be formed of a conductive material with an acoustic impedance different from the acoustic impedance of the substrate of the human presence sensor unit 600, and from the acoustic impedance of the frame sheet metal 33 to which the angle adjusting pedestal 30 is fixed. That is, for example, it can be formed of a "conductive resin." Even in this case, an effect similar to the above-described effect can be obtained.

While a configuration in which the human presence sensor unit 600 in which the ultrasonic wave sensor 32 is mounted is installed on the pedestal or the like to detect an object such as a person has been illustrated, detecting a person or the like is not limited to being done with the use of an ultrasonic wave.

Another sensor, such as a sonic wave sensor that outputs a sonic wave and can detect an object or a person upon receiving the reflection wave of the sonic wave, can be used. According to such a configuration, a vibration generated from a sonic wave sensor can be prevented from being transmitted to a frame sheet metal or the like for fixing a substrate on which the sonic wave sensor is mounted, a malfunction caused by reverberation (sonic wave diffuse reflection) toward the sonic wave sensor can be prevented, and the clear detection sensitivity cab be obtained even in a close range.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-149190 filed Jul. 29, 2016, which is hereby incorporated by reference herein in its entirety.

What is claimed is:

1. An electronic device, comprising:
a substrate on which a sonic wave output element that outputs a sonic wave and that receives the sonic wave is mounted;
a pedestal to which the substrate is attached, the pedestal being made of a nonconductive material;
a frame to which the pedestal is attached, the frame being made of a conductive material; and
a conductive tape which electrically contacts the substrate and the frame.

2. The electronic device according to claim 1,
wherein the pedestal is made of a material with an acoustic impedance different from an acoustic impedance of a material of the substrate.

3. The electronic device according to claim 1,
wherein the pedestal is made of a synthetic resin material, and
wherein the frame is made of a metal material.

4. The electronic device according to claim 1,
wherein the pedestal is made of a metal material, and
wherein the frame is made of a synthetic resin material.

5. The electronic device according to claim 1, further comprising a control unit configured to shift a power state of the electronic device from a second power state to a first power state based on an intensity of the sonic wave received by the sonic wave output element,
wherein the second power state consumes less power than in the first power state.

6. The electronic device according to claim 1,
wherein the electronic device is an image forming apparatus.

7. The electronic device according to claim 1,
wherein the pedestal is made of a material with an acoustic impedance different from an acoustic impedance of a material of the frame.

8. An electronic device, comprising:
a substrate on which a sonic wave output element that outputs a sonic wave and that receives the sonic wave is mounted;
a pedestal to which the substrate is attached, the pedestal being made of a nonconductive material;
a frame to which the pedestal is attached, the frame being made of a conductive material; and
a conductive leaf spring which electrically contacts the substrate and the frame.

9. The electronic device according to claim 8,
wherein the pedestal is made of a material with an acoustic impedance different from an acoustic impedance of a material of the substrate.

10. The electronic device according to claim 8,
wherein the pedestal is made of a synthetic resin material, and
wherein the frame is made of a metal material.

11. The electronic device according to claim 8,
wherein the pedestal is made of a metal material, and
wherein the frame is made of a synthetic resin material.

12. The electronic device according to claim 8, further comprising a control unit configured to shift a power state of the electronic device from a second power state to a first power state based on an intensity of the sonic wave received by the sonic wave output element,
wherein the second power state consumes less power than in the first power state.

13. The electronic device according to claim 8,
wherein the electronic device is an image forming apparatus.

14. The electronic device according to claim 8,
wherein the pedestal is made of a material with an acoustic impedance different from an acoustic impedance of a material of the frame.

* * * * *